United States Patent Office 3,238,100
Patented Mar. 1, 1966

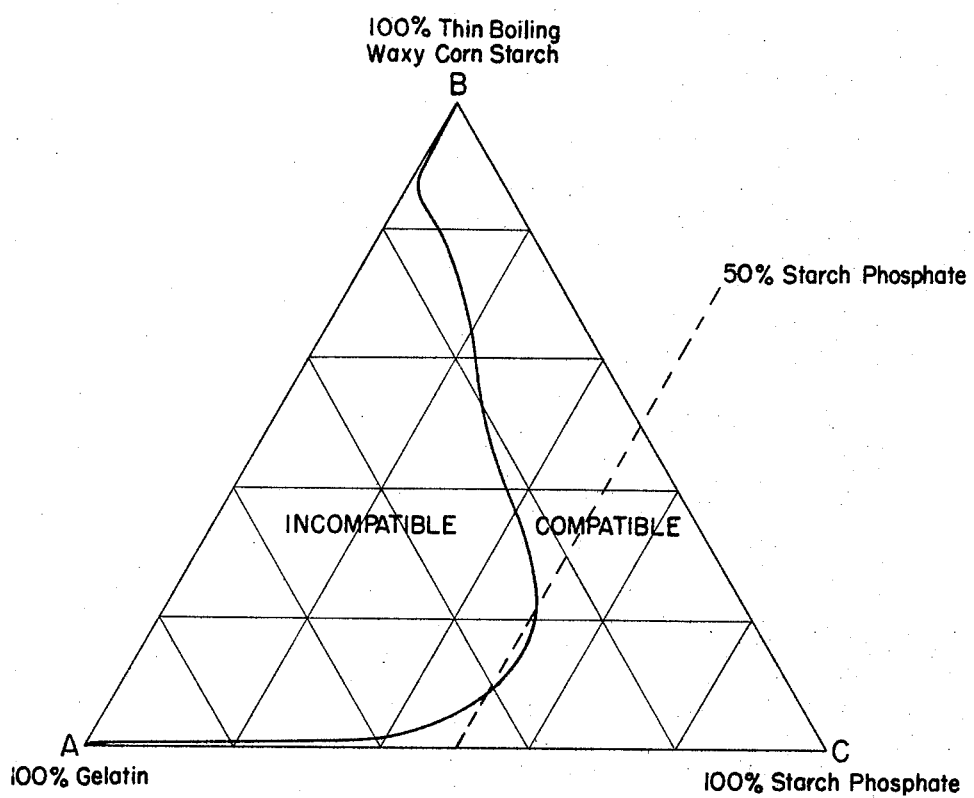

3,238,100
STARCH PHOSPHATE FILM COMPOSITION AND METHOD OF DRESSING WOUNDS WITH SAME
Herbert Carl A. Meyer, Chicago, Ill., Robert L. Milloch, New York, N.Y., and Vajra Shreeram, Chicago, and Toshio Tsuzuki, Oak Lawn, Ill., assignors to American Maize-Products Company, a corporation of Maine
Filed July 23, 1963, Ser. No. 297,159
9 Claims. (Cl. 167—58)

This invention relates to starch and starch phosphate compositions, to films prepared from such compositions and to a method of using certain of such films as a dressing for skin wounds which heal primarily by the mechanism of growth of granulation tissue.

In the pathology and healing of open skin wounds, two general types of wounds may be differentiated. First, there is the clean, sharp, incision-type wound where no substantial amount of tissue is lost and the tissue surfaces separated by the incision can be juxtaposed without stretching, for example by sewing. This gives the tissue surfaces an opportunity to fuse together directly and regain continuity by the healing mechanism of primary union. In contrast, there is the second general class of wounds wherein such a large quantity of tissue is removed or lost across the surface of the wound that the raw tissues exposed in the gap of the wound can no longer be juxtaposed nor fused together directly because the degree to which the skin surrounding the wound would have to be stretched is excessive or impossible. Examples of the latter class of wounds are severe burns, abrasions, lacerations and the like.

Where a substantial amount of tissue has been lost, the gap of the wound is gradually filled by a mass of new blood vessels and cells which grow from the base of the wound up to the level of the surrounding surface skin and which are called granulation tissue. When examined 48 hours after infliction, the tissue surfaces of a clean, open wound of this type seem to be covered with tiny red granules, with an appearance similar to a pile of rough velvet. While this red, finely granular surface is an indication of normal and healthy healing by the mechanism of growth of granulation tissue, such a surface is fragile, highly vascular and bleeds very readily. If, for example, a dry gauze dressing should stick to the surface and then be torn off, the young capillary blood vessels are ruptured, and the process of healing is temporarily arrested. Also, the growth of granulation tissue may be inhibited by infection which is quite often spawned by the debris of dead tissue, coagulated blood and other necrotic products of the wound. This also slows down healing and is of particular disadvantage where skin grafts over healthy granulation tissue are necessary for complete healing as in severe second and third degree burns.

Heretofore, the most widely used dressing for wounds involving loss of tissue has been dry gauze impregnated with a semi-solid, jelly lubricant such as petrolatum. The petrolatum prevents adhesion of the gauze to the wounded area so that the dressing may be readily removed and replaced as, for example, where the wound is to be treated with chemotherapeutic agents. The disadvantage to the conventional dressing is that it tends to act as a complete seal over the area of the wound and causes exudate and edema fluids discharging from the wound to accumulate under the dressing which in turn maintains the underlying tissues excessively soft and wet. Such conditions are unfavorable to the healing process, particularly in the case where skin grafts are required since dry, healthy granulation tissue is the necessary foundation for skin grafts which are to take hold successfully and grow. Furthermore, excessive accumulation of exudate and edema fluids under the conventional dressing establishes an environment which will more likely result in infection than where the wound is given an opportunity to dry rapidly.

We have now discovered a new method of treatment for the above-described skin wounds which involves the use of dressings consisting of films formed at least of certain essential starch phosphate compositions. In our method a starch phosphate composition, in the form of a film having certain physical characteristics, is placed in direct contact with the damaged tissues of a skin wound. Use of the film in this manner has given exceptional and remarkable advantages in promoting the healing of wounds. The film being water soluble and self-adherent, no external means are required to hold it in place over the wound. The film is sufficiently pliable, elastic and strong to permit limited movement of the area of the wound without dislodgement of the film relative to the wound. The film is transparent and consequently permits observation of the wound and its healing progress without having to remove the film as is necessary with conventional dressings. The film is permeable to edema fluids and certain of its soluble components such as salts and electrolytes, but not to proteinaceous materials such as albumin. As a result, the wound is caused to dry in a shorter time and, since the proteinaceous components are retained, the tendency towards shock is minimized. The film, in time, is digested by enzymes liberated by the granulation tissue and thus is either assimilated or discarded or both as an inherent function of the natural healing process. The film produces no adverse local tissue reactions or systemic antigenicity.

Another significant advantage is achieved when the film is used as a dressing for severe burns. Such injuries are often subjected to hydrotherapy treatments involving submersion in continuously swirling water. Heretofore, conventional burn dressings have had to be first removed for such hydrotherapy treatments and adherence of the dressing has caused much difficulty in effecting its removal without damaging the wound and subjecting the patient to pain. With the starch phosphate film dressing of our method, we have found that there is no need for removing the dressing at all. The dressing itself can be submerged in water for hydrotherapy and, within a short time, the dressing will soften and either fall off the area of the wound or dissolve and disappear. When the treatment has been completed, a new film dressing can be placed upon the wound for continued protection and promotion of healing.

The ultimate and most important benefits of our invention are a more rapid rate of healing, a sharp decrease in the incidence of infection, an earlier and more rapid growth of granulation tissue making successful skin grafts possible much sooner and minimization of interference with the natural healing process which is always a factor in the application of external dressings to skin and raw tissue surfaces. Such benefits have been obtained repeatedly with laboratory animals and represent a material advance in the art of treatment and healing of wounds.

In accordance with our invention, a composition of matter which includes starch phosphate as an essential ingredient thereof is used to form the films which have been found to excel so remarkably as wound dressings. The term starch phosphate refers to a type of starch derivative which is formed by reaction between starch and an alkali metal phosphate salt under controlled conditions and which, relatively speaking, has been only recently disclosed in the prior art as a new material. The general procedure used for preparing this type of starch derivative is to first impregnate ungelatinized starch granules with an aqueous solution of an alkali metal phosphate salt. After the granules have been separated from excess of the phosphate solution, they are dried to a moisture content of not more than about 20% by the weight of the granules. The granules are then heated to a temperature in excess of 100° C. and in the absence of any additional moisture aside from that which is contained in the granules, and the control of moisture content and high reaction temperatures distinguishes this type of starch phosphate derivatives from other products of reaction between starch and a phosphate. At the high temperatures, reaction proceeds directly between the starch and the alkali metal phosphate to yield a starch phosphate derivative which can be dissolved in water to form low-solids, high-viscosity solutions. For example, a 5% aqueous solution of the above-described starch phosphate derivatives may have a viscosity of 30,000 to 50,000 cps. More specific details of preparing the above-described starch phosphate derivatives are given in U.S. Patents 2,884,412; 2,884,413 and 2,993,041, and any of such starch phosphate derivatives may be used in carrying out our invention.

It is possible to use films prepared from solely a starch phosphate derivative dissolved in water as a dressing for wounds in accordance with the invention, and excellent results in fact have been noted with such films. However, pure starch phosphate films tend to become brittle with handling and storage at atmospheric humidities, and if the films are not to be used immediately, storage conditions of about 50% relative humidity would usually be necessary to prevent excessive embrittlement of the films. On the other hand, once pure starch phosphate films are placed over a wound, the exudate and edema fluids discharging from the wound will soften the film somewhat so that there is no longer any problem of embrittlement or loss of flexibility.

However, in view of the relative inconvenience of using pure starch phosphate films, as described above, we prefer to add to the parent starch phosphate composition from which the films are to be prepared certain ingredients which have been found to be very effective in preventing loss of plasticity, flexibility and tensile strength in the films over considerable periods of time, with a consequent gain in the storage life and convenience of using the film. The two basic ingredients which we prefer to use for these purposes are gelatin and glycerine. Gelatin is known to have a high capacity for forming films having considerable tensile strength. When added to the starch phosphate films which we use, gelatin gives an increase in flexibility, tensile strength and the degree of physical handling to which the films may be subjected without deterioration.

Since the gelatin is fully compatible with the starch phosphate derivatives, the range of proportion may vary considerably between the two materials. We have found that anywhere from 0.1 part to 10 parts of gelatin may be added to 1 part of starch phosphate derivative used in the film forming composition. Less than 0.1 part gelatin does not give sufficient benefits so as to be of significance in extending the storage life of the pure starch phosphate film. On the other hand, more than 10 parts gelatin gives no added advantage and is not only wasteful but leaves too little starch phosphate derivative in the film for achieving the remarkable results which are possible with the invention in the healing of wounds. In general, we prefer to use the gelatin in a range of proportions of from 0.25 to 1 part of gelatin to 1 part of starch phosphate derivative in the film-forming composition. For use in the films of our invention it is preferable that the gelatin have a Bloom rating within the range of about 100 to 300.

While gelatin is the preferred material for increasing tensile strength and flexibility, other ingredients may also be used in its place. In this connection we have found that pectins and carboxymethylcellulose are also of utility in increasing the tensile strength of the starch phosphate derivative films when used in the same proportions as stated above for the gelatin.

As for glycerine, this ingredient acts as a plasticizer and increases the internal flexibility of the pure starch phosphate derivative film. We prefer to use glycerine in a lower proportion than the gelatin and generally speaking from 0.1 part to 0.5 part of glycerine may be used for 1 part of starch phosphate derivative in the composition. Amounts within this range will give sufficient plasticization of the starch phosphate derivative film for virtually all practical applications. Similar amounts of other polyhydric compounds such as propylene glycol, sorbitol and water soluble polyolefinic polyols may be used in place of the glycerine to achieve plasticization in the film. Both the gelatin and glycerine do not produce adverse tissue reactions or interfere with the healing process so that use of these ingredients does not limit the advantages derived from using our method of dressing and healing wounds.

Our work with the use of starch phosphate films as wound dressings, and particularly in the aspect of including gelatin in such films, has lead to other valuable and quite unexpected results in the field of commercial films generally. It has long been known that films prepared from solutions of the known varieties of common starch have such serious shortcomings that such films cannot be used satisfactorily in various applications such as packaging, encapsulation, etc. One of the most serious problems with starch films has been lack of adequate tensile strength and extreme brittleness, the latter indicating a lack of flexibility. While it may be possible to form a film of pure starch solution, in a short time the film becomes brittle, loses excessive amounts of moisture and dries to a friable, horny mass. For these reasons, films made purely from starch have not been and are not sold commercially.

While attempts may have been made to overcome the shortcomings of pure starch films by the use of additives, these have not been successful to any significant degree. In particular, it is well known for example that an aqueous solution of gelatin (not a gel), which is an excellent film-forming material, is largely incompatible with aqueous solutions or pastes of gelatinized starch or starch dextrines. Ordinarily, when these materials are mixed together the gelatin will separate as an upper layer over the starch or dextrine material and therefore the gelatin cannot be successfully incorporated in a pure starch film.

We have now unexpectedly found that the starch phosphate derivative which we used in films for wound dressings apparently can act as a coupler between gelatin and ordinary starch whereby the three materials can be admixed over a substantial range of concentration to form completely compatible mixtures which remain stable and homogeneous on standing. This is of material benefit to our new method of dressing wounds since the films to be used in this method are far more economical to manufacture when the least expensive material of all, ordinary starch, is substituted in part for the more costly material gelatin. Furthermore, mixing in ordinary starch as a component of the film does not result in loss of the preferred characteristics of tensile strength, flexibility and adequate shelf life which we desire in the film for use as wound dressings.

We have made very extensive tests and have found that there is a large area of compatibility in the three component system of starch phosphate derivative-gelatin-starch, and films formed from these compatible admixtures may be advantageously used as wound dressings in accordance with our invention. This will be more fully described hereinbelow in connection with the description relating to the accompanying drawings.

In addition to providing substantial benefits to our new method of treating wounds, the fact that starch phosphate derivative is an effective coupling agent between gelatin and ordinary starch is of tremendous commercial significance as regards the preparation and use of starch films. As mentioned previously, starch films have not heretofore been available commercially although the fact that they are potentially water soluble, edible and nutritious makes them considerably attractive for various applications. In accordance with our invention, starch films can now be readily prepared with adequate tensile strength, flexibility and plasticity because gelatin can be incorporated therein with complete compatibility by use of the starch phosphate derivative as a coupling agent. The starch films thus prepared have wide application as a packaging material for dry food mixes, coffee, cocoa and other food stuffs, as capsules for medicines and, pharmaceuticals, as the outer shell of suppositories, as drop-in-and-dissolve packages for soaps, synthetic detergents and the like, and other applications which will be apparent to those in the art. Such films represent a totally new means of using starch which is a plentiful and inexpensive raw material in this application.

In carrying out the method of our invention, there are two general procedures which may be used. The first and the preferred method is to separately prepare films containing the essential ingredient starch phosphate derivative and then use these preformed films to dress and treat skin wounds much like ordinary bandages are used. The films may be preformed in any conventional manner. The starch phosphate derivative and the preferred optional ingredients such as gelatin, glycerine, or ordinary starch are mixed together in a sufficient amount of water to make a fluid, workable film-forming composition. The concentration of total solids in the aqueous film-forming composition may be anywhere within the range of 3% to 30% based on the weight of the composition, and the actual concentration will depend not only on the number and nature of ingredients but also on the method which is used to form the film.

The aqueous film-forming composition will have to be heated sufficiently to gelatinize the starch, if starch should be included, or gentle heat may be applied in the absence of starch to aid in the mixing of the various components and to form a completely homogenous solution thereof. Thereafter films may be cast upon flat plates or on an endless belt by extrusion or by sheeting out under a doctor blade. The films are then dried at controlled temperature and humidity, preferably at 72° F. and 50% relative humidity. It is also preferable to hold the films under these controlled atmospheric conditions for a certain period of time after drying, say, for up to 24 hours or more. This helps stabilize the physical characteristics of the film whereby dimensional changes over long periods of storage are minimized. For use as wound dressings, the films may then be sterilized in conventional manner, as by contact with ethylene oxide gas, and thereafter the films can be packaged in hermetically sealed containers for aseptic shipment and storage. If desired, antibacterial agents such as nitrofurazone, sulfonamids and antibiotics may be included in films to be used as wound dressings, in amounts up to about 0.1% based on the weight of film solids.

The second general procedure for carrying out our invention is to form the film dressing in situ upon the wound itself. In this method, the aqueous film-forming composition may be brushed, sprayed or otherwise applied directly to the area of the wound and the film will be formed by evaporation of water and drying directly upon the wound. If desired, gentle heat may be applied to the wounded area, with infrared lamps for example, to assist in the in situ process of film formation.

We have determined that the film must have a controlled thickness in order to provide the benefits of the invention as a wound dressing. Such controlled film thickness will have to be within the range from about 1 to about 10 mils, whether applied as a preformed film or in situ. Actually, films having a relatively high gelatin content can be made in a thickness as low as 0.5 mil. However, these films are so thin as to be mechanically weak and readily torn or otherwise disrupted when used as a wound dressing. Films thicker than 10 mils are excessively thick and difficult to shape to body contours. Furthermore, films in excess of 10 mils thickness slow down the discharge of exudate and edema fluids through the film, away from the underlying wound. This, of course, can result in a slowing down of the healing process and should therefore be avoided. Within the thickness range stated, films containing starch phosphate and one or more of the various optional components described above will be found useful for virtually all applications in the treatment and dressing of wounds.

In addition to thickness, the tensile strength of films to be used as wound dressings is critical. The tensile strength will have to be at least about 3,000 p.s.i. for, otherwise, the film will be too weak mechanically to act as a protective cover over the area of the wound. The tensile strength of the film may of course be higher but the value 3,000 p.s.i. is about the minimum for practical application. On the other hand, for non-wound dressing applications it is preferred that the tensile strength be higher and at least about 5,000 p.s.i. Any desired tensile strength in the films may be achieved by selecting suitable proportions of gelatin or the other materials mentioned previously as being useful for increasing the tensile strength.

As previously described, the films are water soluble and self-adherent when wet and thus may be placed in direct contact with the damaged tissues of a wound. If desired, dry gauze or other material may be held over the film to absorb exudate and edema fluids passing through the film. The film can be removed simply by dissolving in water and replenished whenever and as often as may be required. Further details of the invention will be understood by reference to the accompanying drawing which is a phase diagram of starch phosphate derivative-gelatin-starch compatible admixtures, and the following examples.

EXAMPLE 1

In order to test the method of the invention for treating wounds, four burns of substantially equal size and severity were inflicted by blow torch upon the back of a laboratory dog, the area of each wound being defined by black masses of carbonized tissue. A starch phosphate derivative was prepared by reacting starch granules with monosodium phosphate in the manner described in U.S. Patent 2,884,414. The starch phosphate derivative was dissolved in heated water to form a 10% solution by weight and films approximately 3 mils thick were cast from the hot solution upon glass plates. The films were dried and conditioned for 24 hours at 72° F. and 50% relatively humidity. After sterilization, the preformed films were placed over two of the burns and the other two burns were covered with a conventional gauze-petrolatum dressing, as previously described.

Four days after the dressings were applied as described above, the burns treated with the conventional dressing had increased in size and lacked a crusty, dry eschar which was prevented from forming by the water insoluble seal established by the petrolatum lubricant. On the other hand, the two burns which were dressed with starch phosphate film in accordance with our invention had not enlarged significantly beyond the area of the original wounds as inflicted and had already dried to a considerable extent. Furthermore, infection had set in in the wounds dressed with the conventional dressing as shown by large, white areas which were covered with pus. The wounds treated with starch phosphate film were covered by a dry, crusty eschar and there were no signs of infection.

Five days after start of the treatments described above the eschar over one of the wounds treated with the starch phosphate film was retracted partially to examine the underlying tissues. All of the wounds were examined at the same time and not much change had occurred in the condition of the wounds which were treated with the conventional gauze-petrolatum dressing. There was only one dark narrow streak of granulation tissue in one of the conventionally treated wounds, insignificant in comparison to the total area of the wound which was still badly infected, with large areas of the wound discharging pussy exudate. The other conventionally treated wound showed no granulation tissue to speak of. At least two days of additional special treatment would have been necessary in order to heal these wounds to the point where skin grafts could be successfully placed thereon.

The wounds treated with starch phosphate film, on the other hand, were in excellent condition, as regards healing progress. By now, the starch phosphate film had been partially digested and had lost its identity. Tissue had grown into the film which had become part of the crusty, dry and fairly rigid eschars. The surface underlying the eschar was almost entirely a dark mass of healthy, red granulation tissue which was free of infection. The wound had healed to a satisfactory degree for the placement of skin grafts. This remarkably rapid healing progress was achieved without use of external chemotherapeutic agents and could be directly attributed to the starch phosphate film dressing.

The treatments described above have been repeated over a period of more than six months and the results have been the same. In all cases, the starch phosphate film dressing leads to faster growth of granulation tissue and minimization of infection, so that the healing process is materially accelerated.

EXAMPLE 2

The compatibility with gelatin of three different starches having moderate film-forming capacities and the characteristics of films made from the mixtures were compared with similar compositions of starch phosphate derivative and gelatin. The three starches used were (1) a high-amylose corn starch treated with 2.5% chlorine and then acetylated to 6.0% acetyl group content, (2) an acid-treated thin-boiling waxy corn starch and (3) a chlorinated corn starch. Starches (1) and (3) at 10% concentration pasted in equeous slurry and starch (2) at 20% concentration pasted in an aqueous slurry, were each thereafter cooked under a pressure of 15 p.s.i. for 15 minutes. Portions of each starch solution were mixed with a warm 10% solution of 250 Bloom gelatin so that films could be made with starch-gelatin ratios of 3:1, 1:1, and 1:3. Films of 100% of starch and 100% gelatin were also prepared. All of the films were plasticized by addition of 15% glycerine based on the total solids in each. Films with a thickness of about 2 mils were cast from hot solutions and were dried and conditioned at 72° F. and 50% relative humidity for 24 hours. Tensile strength and elongation were also measured under the same atmospheric condition. The results are given below:

whereas the other starches exhibit opacity and are incompatible at the majority of concentrations in the measured range. Secondly, film elongation reaches a maximum at 1:1 ratio of starch phosphate derivative to gelatin whereas the elongation decreases drastically as the ratio of the other starches to gelatin is increased. Thus, the starch phosphate derivative is unique in its physical properties as regards compatibility with gelatin and percent elongation of the combinations thereof.

EXAMPLE 3

Aliquot portions of 10% aqueous solutions of gelatin, the starch phosphate derivative of Example 1 and thin boiling waxy corn starch were mixed together in various concentrations. Each composition was placed in a test tube which was heated in a steam bath for 5 minutes, then sealed and shaken vigorously and finally left to stand in a rack. After 2 hours, each test tube was examined for possible phase separation. Those compositions which showed a slight or greater degree of phase separation were designated incompatible, and those showing no phase separation compatible. Compositions intermediate these designations were termed borderline. The results are given below:

| Thin Boiling Waxy Corn Starch | Starch Phosphate | Gelatin | Compatibility |
|---|---|---|---|
| 0 | 20 | 80 | Yes. |
| 0 | 40 | 60 | Yes. |
| 0 | 60 | 40 | Yes. |
| 0 | 80 | 20 | Yes. |
| 5 | 47.5 | 47.5 | Borderline. |
| 10 | 30 | 60 | No. |
| 10.4 | 48 | 41.6 | Borderline. |
| 11.1 | 44.45 | 44.45 | No. |
| 16.7 | 16.7 | 66.6 | No. |
| 16.7 | 66.6 | 16.7 | Yes. |
| 18.2 | 9 | 72.8 | No. |
| 16.7 | 50 | 33.3 | Borderline. |
| 20 | 50 | 30 | Do. |
| 20 | 0 | 80 | No. |
| 23 | 30.8 | 46.2 | No. |
| 23 | 46.2 | 30.8 | Borderline. |
| 25 | 50 | 25 | Yes. |
| 27 | 55 | 18 | Yes. |
| 33.3 | 33.3 | 33.3 | No. |
| 36.4 | 9 | 54.6 | No. |
| 37.5 | 37.5 | 25 | Borderline. |
| 40 | 0 | 60 | No. |
| 41.5 | 41.5 | 17 | Yes. |
| 43.5 | 43.5 | 13 | Yes. |
| 50 | 30 | 20 | Yes. |
| 54.6 | 9 | 36.4 | No. |
| 54 | 23 | 23 | No. |
| 60 | 0 | 40 | No. |
| 70 | 20 | 10 | Yes. |
| 72 | 14 | 14 | Borderline. |
| 72.8 | 9 | 18.2 | No. |
| 80 | 0 | 20 | No. |
| 80 | 4 | 16 | No. |
| 80 | 10 | 10 | Yes. |
| 85 | 3 | 12 | Yes. |
| 90 | 3 | 7 | Yes. |

| | Starch-Gelatin Ratio | Appearance | Tensil Strength, p.s.i. | Elongation, percent |
|---|---|---|---|---|
| Gelatin | | Clear | 6,170 | 24 |
| High Amylose Corn Starch | 1:3 | Slightly opaque | 5,930 | 12 |
| | 1:1 | Opaque | 5,690 | 5.0 |
| | 3:1 | Slightly opaque | 5,440 | 3.8 |
| | 1:0 | Opaque | 4,310 | 1.5 |
| Thin Boiling Waxy Corn Starch | 1:3 | Slightly opaque | 5,380 | 18 |
| | 1:1 | Inhomogeneous texture | 3,310 | 1.0 |
| | 3:1 | Opaque | 2,030 | 0 |
| | 1:0 | Clear | 1,800 | 0 |
| C12 Treated Corn Starch | 1:3 | Clear | 5,370 | 24 |
| | 1:1 | Opaque | 2,820 | 3.0 |
| | 3:1 | Slightly opaque | 2,720 | 0.5 |
| | 1:0 | Clear | 2,360 | 0 |
| Starch Phosphate | 1:3 | do | 5,480 | 30 |
| | 1:1 | do | 4,400 | 35 |
| | 3:1 | do | 4,040 | 14.5 |
| | 1:0 | do | 3,250 | 0.5 |

From the foregoing, it is evident that the starch phosphate derivative is different from the other so-called film-forming starches. First of all, the starch phosphate derivative forms clear films showing it is compatible with gelatin through all measured ranges of concentration, From the foregoing and other data, the phase diagram shown in FIG. 5 was derived. In this diagram, apex A represents 100% gelatin, apex B 100% thin boiling waxy corn starch and apex C 100% starch phosphate derivative. As can be seen, the starch phosphate derivative is effective to make compatible gelatin and the starch, two ordinarily incompatible materials, in a substantial range of varying concentrations. In fact, a large portion of the area of compatibility is in a range of 0 to 30% gelatin and less than 50% starch phosphate. For example, at 47% starch phosphate derivative, equal amounts of gelatin and thin boiling waxy corn starch, 26.5%, are fully compatible with each other and make up more than one half the materials in the entire system. Thus, by the use of starch phosphate derivative, films having the good strength characteristics of gelatin films but far more economical may be prepared for use as wound dressings in accordance with our invention.

EXAMPLE 4

A starch phosphate derivative was prepared in accordance with the method described in U.S. Patent 2,884,412 by reacting starch granules with tri-sodium phosphate. The granules were mixed with powdered gelatin in the proportion of one part starch phosphate derivative to one part of gelatin. The mixture was dissolved in water to form a solution containing 10% of the mixture by weight of the solution. 15% glycerine based on the weight of the mixture in the solution was then added. The solution was heated and films were cast upon glass plates from the heated solution. The films were dried and maintained in an atmosphere of 72° F. and 50% relative humidity for 24 hours. The average tensile strength of the films was found to be 5000 p.s.i. in this atmosphere. This value exceeds the tensile strength obtained with practically all pure starch films.

While the method of the invention has now been described in terms of treating open skin wounds which heal by the growth of granulation tissue, and the most significant benefits are achieved in the treatment of such wounds, it will be obvious to those skilled in the art that the invention is suitabe for the treatment of other types of skin wounds as well, incision or otherwise. The use of films as a dressing is a convenient and effective way to protect tissues which require a favorable, aseptic environment for healing and growth. Furthermore, the films may be used as a vehicle for applying chemotherapeutic agents and other medicaments which aid the growth and healing processes.

It will be understood that it is intended to cover all changes and modifications of the preferred embodiments of the invention herein chosen for the purpose of illustration which do not constitute departures from the spirit and scope of the invention.

We claim:

1. A method of dressing an open skin wound which comprises covering the wound with a film containing as an essential ingredient thereof a heat reaction product of starch granules and an alkali metal phosphate salt, said film having a thickness within the range from about 1 to about 10 mils and having a tensile strength of at least about 3,000 p.s.i., said reaction product being made by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

2. A method in accordance with claim 1 in which said film contains from about 0.1 to about 10 parts of gelatin for each part of said starch phosphate reaction product.

3. A method in accordance with claim 1 in which said film contains from about 0.1 to about 0.5 part of glycerine for each part of said starch phosphate reaction product.

4. A film-forming composition which comprises a heat reaction product of starch granules and an alkali metal phosphate salt, from about 0.1 to about 10 parts of gelatin for each part of said reaction product, and a sufficient amount of water to dissolve said reaction product and gelatin in a film-forming concentration, said reaction product being made by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

5. A film-forming composition in accordance with claim 4 which includes in an amount compatible therewith ordinary starch.

6. A protective dressing for wounds which comprises a film containing as an essential ingredient thereof a heat reaction product of starch granules and an alkali metal phosphate salt, said film having a thickness within the range from about 1 to about 10 mils and having a tensile strength of at least about 3,000 p.s.i., said reaction product being made by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

7. A film in accordance with claim 6 which includes from about 0.1 to about 10 parts of gelatin for each part of said starch phosphate reaction product.

8. A film in accordance with claim 6 which includes from about 0.1 to about 0.5 part of glycerine for each part of said starch phosphate reaction product.

9. A film in accordance with claim 6 which has been dried and conditioned for about 24 hours in an atmosphere maintained at 72° F. and 50% relative humidity.

References Cited by the Examiner

UNITED STATES PATENTS

| 2,338,416 | 1/1944 | Fales | 167—58.4 |
| 3,060,171 | 10/1962 | Sietsema | 260—233.5 |
| 3,122,482 | 2/1964 | Smith | 167—58 X |

FOREIGN PATENTS 812,340  4/1959  Great Britain.

LEWIS GOTTS, *Primary Examiner.*

FRANK CACCIAPAGLIA, JR., *Examiner.*